US007978019B2

(12) United States Patent
Wiesbauer et al.

(10) Patent No.: US 7,978,019 B2
(45) Date of Patent: Jul. 12, 2011

(54) CONFIGURATION HAVING AN RF COMPONENT AND A METHOD FOR COMPENSATION OF LINKING INDUCTANCE

(75) Inventors: Kurt Wiesbauer, Deutschlandsberg (AT); Christian Korden, Munich (DE)

(73) Assignee: EPCOS AG, Munich (DE)

( * ) Notice: Subject to any disclaimer, the term of this patent is extended or adjusted under 35 U.S.C. 154(b) by 6 days.

(21) Appl. No.: 12/477,740

(22) Filed: Jun. 3, 2009

(65) Prior Publication Data

US 2009/0284328 A1 Nov. 19, 2009

Related U.S. Application Data

(63) Continuation of application No. PCT/DE2007/002078, filed on Nov. 14, 2007.

(30) Foreign Application Priority Data

Dec. 19, 2006 (DE) ......................... 10 2006 059 996

(51) Int. Cl.
*H04B 3/28* (2006.01)

(52) U.S. Cl. ......................................... 333/12; 333/177

(58) Field of Classification Search .................... 333/12, 333/24 R, 119, 177, 133, 132
See application file for complete search history.

(56) References Cited

U.S. PATENT DOCUMENTS 1,962,227 A * 6/1934 Zepler .......................... 455/282
5,095,291 A * 3/1992 Staschover et al. ............. 333/12
5,132,647 A * 7/1992 Lopez et al. .................. 333/175
6,788,169 B1 * 9/2004 Schemmann et al. ........ 333/177
7,053,731 B2 5/2006 Iwamoto et al.
2004/0108875 A1 6/2004 Kaushik et al.
2005/0134400 A1 6/2005 Huynh
2005/0242903 A1 11/2005 Inoue et al.
2009/0174497 A1 7/2009 Korden

FOREIGN PATENT DOCUMENTS

DE 10 2006 033 709 A1 1/2008
WO WO 2008/009281 A2 1/2008

OTHER PUBLICATIONS

Fraser, A. et al., "High-speed digital IC package characterization, using microwave probing and fixturing techniques," XP-002473564, pp. 1-18, Cascade Microtech Application Notes, 2002.

(Continued)

*Primary Examiner* — Robert Pascal
*Assistant Examiner* — Kimberly E Glenn
(74) *Attorney, Agent, or Firm* — Slater & Matsil, L.L.P.

(57) ABSTRACT

In a configuration with at least one RF component disposed in a signal path and including a ground connection to an external circuit environment, a coupling element is provided which electromagnetically couples to at least part of the ground connection and at the same time decouples a coupling current. By suitably feeding this coupling current back into the signal path of the component, the negative influence of the inductance of the ground connection on the signal path is thus compensated for.

20 Claims, 3 Drawing Sheets

OTHER PUBLICATIONS

Marksteiner, S. et al., "A Miniature BAW Duplexer using Flip-Chip on LTCC," vol. 2, pp. 1794-1797, 2003 IEEE Ultrasonics Symposium.

Bradley, P. et al., "A 3.8 mm ×3.8 mm ×1.37 mm Hermetic FBAR Duplexer for 800 MHz Handsets with Wafer-Scale Packing," pp. 1694-1697, 2004 IEEE International Ultrasonics, Ferrolectrics, and Frequency Control Joint 50th Anniversity Conference, Canada.

Nakura, T. et al., "On-Chip di/dt Detector Circuit," vol. E88-C, No. 5, May 2005, pp. 782-787, IEICE Transactions on Electronics, Tokyo.

Nakura, T. et al., "Feedforward Active Substrate Noise Cancelling Technique using Power Supply di/dt Detector," Jun. 16-18, 2005, pp. 284-287, 2005 Symposium on VLSI Circuits Digest of Technical Papers, IEEE.

* cited by examiner

CONFIGURATION HAVING AN RF COMPONENT AND A METHOD FOR COMPENSATION OF LINKING INDUCTANCE

This application is a continuation of co-pending International Application No. PCT/DE2007/002078, filed Nov. 14, 2007, which designated the United States and was not published in English, and which claims priority to German Application No. 10 2006 059 996.9 filed Dec. 19, 2006, both of which applications are incorporated herein by reference.

BACKGROUND

A duplexer serves to separate transmitter and receiver signals in an FDD (Frequency Diversity Duplex) system and is used as a passive crossover network in the front end of a terminal device that serves as a transmitter and receiver. In the duplexer, the two bandpass filters can be interconnected a number of different methods in such a manner that simultaneous transmission and reception is possible. The objective in the development of duplexers is to minimize crosstalk. To this end, the transmitter and receiver paths must be extremely well insulated from each other.

With the increasing miniaturization and ever greater complexity due to multiband applications, duplexers for mobile terminal devices are integrated on modules. Because of miniaturization, the general problem is that such a module allows the mass of the duplexer to be connected to ground only to a limited extent since only a finite and therefore limited number of feed-throughs can be fitted on the module because its surface is limited.

A duplexer can be designed in the form of a discrete component with a configuration of two RF components as bandpass filters on a shared carrier substrate. This type of duplexer with a substrate and a chip disposed on said substrate and comprising a transmitter filter and a receiver filter is disclosed in U.S. Pat. No. 7,053,731 B2. Each of these filters comprises a ladder-type configuration of electro-acoustic resonators. However, duplexers can also have single filters implemented with other filter techniques or single filters that utilize different filter techniques.

As known from the above-mentioned U.S. patent, an inadequate ground connection causes a marked reduction of the transmitter/receiver insulation since current flowing to the ground generates a voltage drop across the inductance of the ground connection, which voltage drop affects all signal paths connected to this ground if the ground connection is inadequate. This voltage drop across the inductance is added vectorially to the basic insulation, which is determined by how the duplexer is otherwise wired and by the structure of the package.

When the connection of the component to ground is inadequate, properties, such as the selection of the component, can also be broadbandedly impaired in a single RF component, e.g., a filter.

SUMMARY

In one aspect, the present invention avoids disadvantages associated with an inadequate ground connection by means of a configuration that has at least one RF component.

Disclosed is an RF configuration comprising a first RF component as a filter, which has a signal path connected to an input and an output, and which is connected to a ground in the circuit environment, for example, a PCB (printed circuit board), by means of at least one ground connection. The configuration comprises a coupling element which electromagnetically couples to the ground connection. The coupling current induced in the coupling element when current flows through the ground connection is fed into the signal path of the filter.

Decoupling the coupling current and feeding it into the signal path is preferably handled in such a manner that when current flows through the ground connection, the voltage drop caused by the inductance of the ground connection is reduced and the effects of such a voltage drop on the signal path are compensated for.

In particular in RF filters, the finite inductance of the ground connection produces poles in the stop band or moves poles to potentially undesirable areas so that the selection properties of the filter are negatively affected. This effect can be completely compensated for by means of the proposed configuration.

A more specific embodiment comprises an RF configuration comprising a first and a second RF component which have a shared ground and which are connected to a ground in a circuit environment by means of a shared ground connection. To this end, a coupling element is provided which electromagnetically couples to at least one of the ground connections. This ensures that when current flows through the ground connection, the coupling element decouples a coupling current and feeds it into the signal path of one of the two components. Decoupling the coupling current and feeding it into the signal path are preferably handled in such a manner that when current flows through the ground connection, the voltage drop caused by inductance present in the ground connection is reduced and, in particular, compensated for, since this current drop also affects the signal path and would impair the insulation.

The proposed RF configuration can be used with all components with a "bad" ground and with RF components with a shared ground, the ground connection of which has a finite linking inductance. The inductance of the ground connection can subsequently be utilized for coupling to a coupling element in the form of a coupling inductor. By compensating for the voltage drop in the signal path induced by the ground current, it is possible to considerably reduce the crosstalk between the two components or, after optimization, even prevent it completely. The level of crosstalk between the two components is subsequently low and is generated by the so-called basic insulation, i.e., the finite insulation between the two components that is inherent in the design.

The ground connection of a component is defined as electrical wire connections that connect the ground of the component to the ground of the configuration that comprises the component or both components. Thus, all components that ensure electrical connection to a "good" external ground contribute to the ground connection. The ground connection can be implemented by means of bond wires, stud bumps, solder bumps or standard soldered joints.

In addition, there are electrical connections that are disposed within a substrate, to which and on which the two components can be attached and disposed. Within a substrate, the ground connection comprises in particular at least one feed-through which extends through one or more dielectric layers of the possibly multilayer substrate. In addition, the ground connection can comprise conductor segments which are disposed between two dielectric layers in structured metalized planes within the substrate. The metalized planes can comprise elongated conductor segments or flat-surface conductor areas or metalized areas. Elongated conductor segments can be assembled from straight conductor segments which can also be angled or folded. Using conductor segments or conductor segments in combination with feed-throughs, it is possible to create windings in order to increase the inductance of the ground connection. At least one ground connection comprising a feed-through has a finite inductance which can couple to a coupling element.

The connection of the configuration to ground or the connection of the two components to ground or, in the case of a substrate serving as a module substrate, to the ground of the printed circuit board on which the module comprising the RF configuration is to be mounted, can comprise a plurality of parallel conductor leads, with a conductor lead constituting an electrically conductive connection which can comprise conductor segments and feed-throughs.

If the ground connections have several conductor leads, at least some of these conductor leads are used for coupling, which hereinafter will be referred to as coupling ground connections. The inductance of the coupling ground connection is preferably high compared to the inductance of all of the ground connections of the configuration. The inductance of the coupling ground connection is preferably set to ensure that it is lower than the inductance of the coupling element in the signal path.

Like the coupling ground connection, the coupling element can also be assembled from conductor segments, conductor loops formed from such segments, ground planes, feed-throughs and metalized areas. To be able to obtain an adequate inductance, the coupling element preferably comprises at least one conductor loop. The coupling ground connection can also comprise at least one conductor loop. The conductor loops of the coupling ground connection and the coupling element are preferably routed in the substrate such that they are disposed along a shared longitudinal axis.

The conductor loop of the coupling element can be routed around a coupling ground connection which, at least in sections, is a feed-through. However, the coupling element and the coupling ground connection can also take the form of conductor segments or feed-throughs that are routed parallel to each other.

The distance between the coupling element and the coupling ground connection is preferably shorter than the distance between the coupling element and the remaining conductor leads of the remaining ground connections of the configuration.

For inductive coupling, the coupling element can be serially interconnected in the signal path of the component in which crosstalk is to be reduced. This can be implemented by routing the signal path, at least in sections, in the proximity of the coupling ground connection.

In a preferred embodiment of the RF configuration, the two components are RF filters that are interconnected with a shared antenna. Thus, the RF configuration can be a duplexer or a diplexer.

In a duplexer, a shared antenna is connected to a first signal path that serves as the transmission path and a second signal path that serves as the receiver path, with an RF filter being disposed in each of the two signal paths.

The RF configuration is preferably disposed on a multilayer substrate which can be made of a multilayer ceramic, an LTCC (Low Temperature Cofired Ceramic), an HTCC (High Temperature Cofired Ceramic), a glass fiber-reinforced epoxy resin, an organic laminate or a glass laminate. The coupling element and the coupling ground connection are preferably disposed inside the multilayer substrate.

In a configuration that comprises two RF filters as RF components, the filters, independently of each other, are SAW (Surface Acoustic Wave) filters, BAW (Bulk Acoustic Wave) filters, dielectric ceramic filters or LC filters.

The proposed configuration can be used in a method for insulating two RF components with a shared ground connection, in which the shared ground connection of the two components has a finite inductance, in which the first of the two components induces a voltage drop in the second component by draining current through the ground connection, and in which a coupling current is induced through the ground current by means of a coupling element, which couples to at least part of the ground connection, and is fed into the signal path of the second component in order to at least partially compensate for the voltage drop induced by the ground current of the first component.

BRIEF DESCRIPTION OF THE DRAWINGS

The present invention will be explained in greater detail based on the practical examples below and the attached associated figures. The figures are purely diagrammatic and not drawn to scale, thus not being limited either to the absolute or to the relative dimensions depicted.

DETAILED DESCRIPTION

Figure 1B:
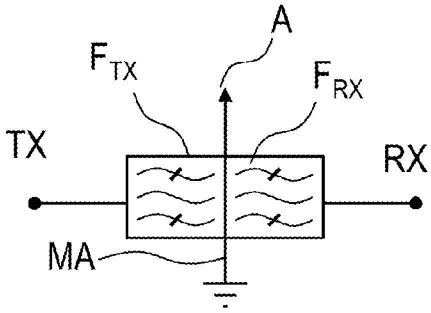
FIG. 1B shows such a configuration in the form of a duplexer.
Figure 1A:
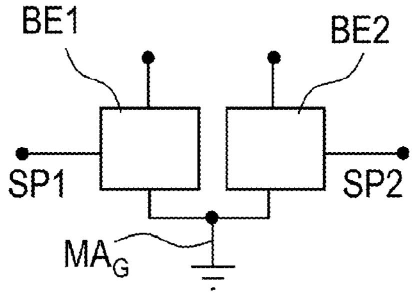
(PRIOR ART) Fig 1A
FIG. 1A shows a prior-art configuration with two RF components and a shared ideal ground connection.

FIG. 1A shows the most basic type of configuration of two components BE1 and BE2 which are connected to ground by means of a shared ground connection $MA_G$. Each of the components has its own signal path SP1, SP2. The ground connection is idealized as shown and therefore free from resistance and inductance.

FIG. 1B shows a duplexer as a possible embodiment of an RF configuration in which the first and the second components are respectively implemented as a transmitter filter $F_{TX}$ and a receiver filter $F_{RX}$. A first signal path runs from the transmitter unit TX to the shared antenna A through the transmitter filter $F_{TX}$. A second signal path runs from antenna A through the receiver filter $F_{RX}$ to the receiver branch RX. This duplexer is also shown with an ideal ground connection MA.

Figure 1C:
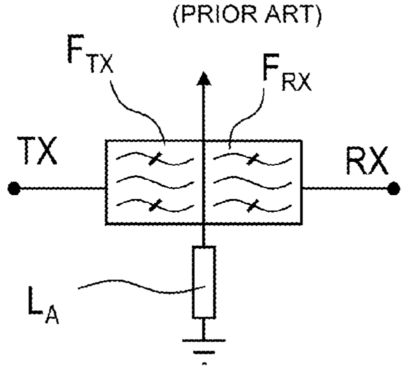
(PRIOR ART) Fig 1C
FIG. 1C shows a configuration in the form of a duplexer with a ground connection in which a real finite inductance is present.

FIG. 1C shows a duplexer in which the ground connection has a finite linking inductance $L_A$. When a signal flows from the transmitter unit through the first signal path, a ground current is simultaneously generated, which current drains by way of the ground connection and thus by way of the linking inductance $L_A$ to the ground. Thus, the inductance $L_A$ induces a voltage drop by way of the ground connection. If the ground is bad or if the linking inductance is too high, this voltage drop has the effect that it sums up to the signals which flow in the second signal path around the receiver branch RX to antenna A, the signal. This is called crosstalk.

Figure 2:
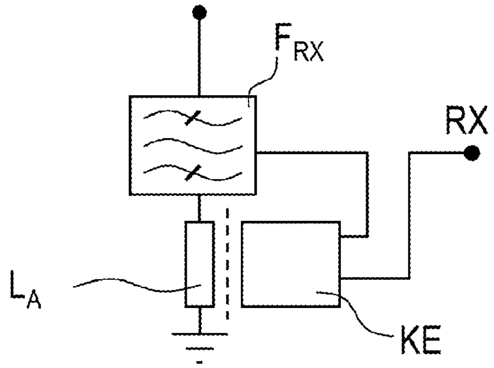
(PRIOR ART) Fig 2
FIG. 2 shows a general practical example of the present invention.

FIG. 2 shows a general embodiment of the proposed RF configuration in which even with a single RF component, in this case receiver filter $F_{RX}$, the negative effect of a bad ground connection, and especially the high linking inductance $L_A$ associated with it, is reduced or even suppressed by means of a coupling element KE and the feedback of the decoupled signal into the signal path RX. To this end, a coupling element KE is provided which is placed in the proximity of the ground connection in which linking inductance $L_A$ is present. In the coupling element KE, a current draining from receiver filter $F_{RX}$ through the ground connection induces a coupling current which is suitably fed into the signal path RX. In the figure, the point at which the coupling takes place is identified by the dashed line.

Figure 3:
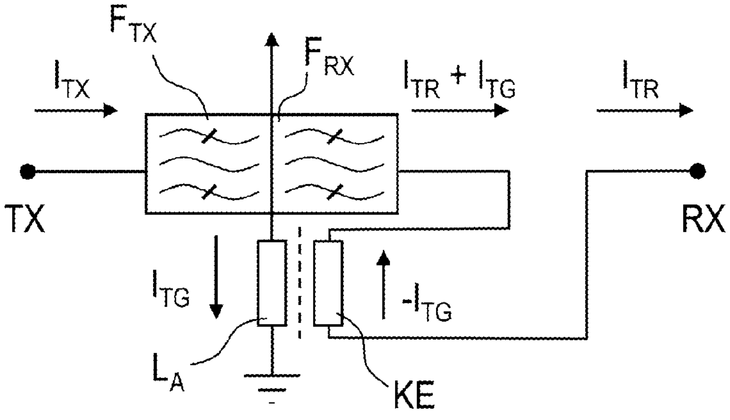
FIG. 3 shows an embodiment in which the coupling element is a coupling inductor.

FIG. 3 shows a configuration in the form of a duplexer with a (receiver) filter $F_{RX}$ and a second RF component $F_{TX}$ in the form of a transmitter filter, which filters share a ground connection. In addition, a possible interconnection of such a coupling element KE in the RF configuration is also shown. In this embodiment, the coupling element KE consists of an additional inductor, or a conductor in which inductance is present, and is disposed in the proximity of the conductor of the ground connection in which the linking inductance $L_A$ is present. The interconnection with the receiver path RX is handled in a simple manner in that the coupling element KE is an inductor and is serially interconnected in the receiver branch RX. When a current $I_{TX}$ flows in the transmitter branch TX, part of this current drains as ground current of the transmitter branch $I_{TG}$ via the shared ground connection or the linking inductance $L_A$. Via inductive coupling, a coupling current $-I_{TG}$ is generated in the neighboring coupling element KE, which current, in the ideal case, is identical to the current $I_{TG}$ that drains via the linking inductance or the ground connection. Because of a finite basic insulation which leads to slight crosstalk to the second signal path (receiver path), a TX/RX crosstalk current $I_{TR}$, which, due to the finite basic insulation, corresponds to this crosstalk, is generated in the receiver path when current flows through the transmitter branch TX (first signal path). The crosstalk current $I_{TG}$ which is impressed by way of the "bad" ground connection in the second signal path (receiver path RX) adds up to the first partial current which was impressed by way of the basic insulation.

By coupling in the coupling current $I_{TG}$, precisely this part of the current which crosstalks by way of the ground connection can be compensated for. Subsequently, only the crosstalk current $I_{TR}$, which cannot be avoided because of the finite basic insulation, flows at the output of the second signal path RX.

In principle, it is, of course, also possible to feed the coupling current with reverse polarity into the signal path, which does not compensate for the crosstalk but which may possibly cancel out negative effects of an "excessively good" ground connection.

Another possibility is to decouple an additional coupling current by way of an additional coupling element (not shown in the figure) and to couple it into the other signal path, e.g., that of the transmitter filter. This makes it possible to cancel out negative effects of the linking inductance in both signal paths.

By choosing suitable values for the linking inductance $L_A$, the coupling element KE and the coupling ratio between the two coupling inductances, it is possible to set the coupling current precisely to the value desired, i.e., to a value that completely compensates for the crosstalk current that is caused by the ground current.

Figure 4:
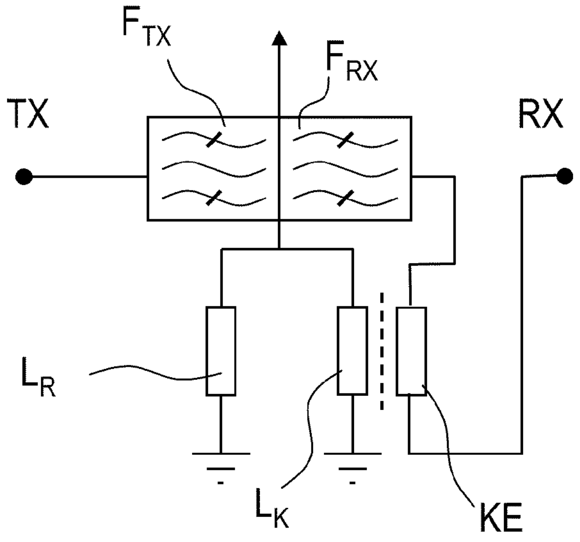
FIG. 4 shows an embodiment in which only part of the ground connection couples to the coupling element.

FIG. 4 shows an embodiment by means of which it is possible to adjust the level of the coupling current. To this end, the entire ground connection of the RF configuration, comprising the first and second component, or in this case the transmitter filter $F_{TX}$ and the receiver filter $F_{RX}$, is split, starting from a shared ground, into a plurality of ground connection branches, i.e., into a plurality of conductor segments which are routed parallel to ground (ground of the PCB). At least one of these links routed to ground is utilized as coupling linking inductance $L_K$. Depending on the number of wiring connections routed to the ground and on the inductance $L_K$ at the time, and the given total inductance, the level of the coupling linking inductance $L_K$ can be adjusted. The coupling linking inductance $L_K$ and the residual inductance $L_R$ of the remaining non-coupling ground connections are adjusted so that $L_K$ is considerably higher than the residual inductance of the ground connection $L_R$ ($L_K >> L_R$).

Another possibility of adjusting the level of the coupling current $I_{TG}$ that was decoupled by the coupling element KE is via the inductance value of the coupling element and via the coupling ratio between the coupling linking inductance $L_K$ and the coupling element KE.

This solution can also be implemented in a configuration with only one RF component.

Figure 5:
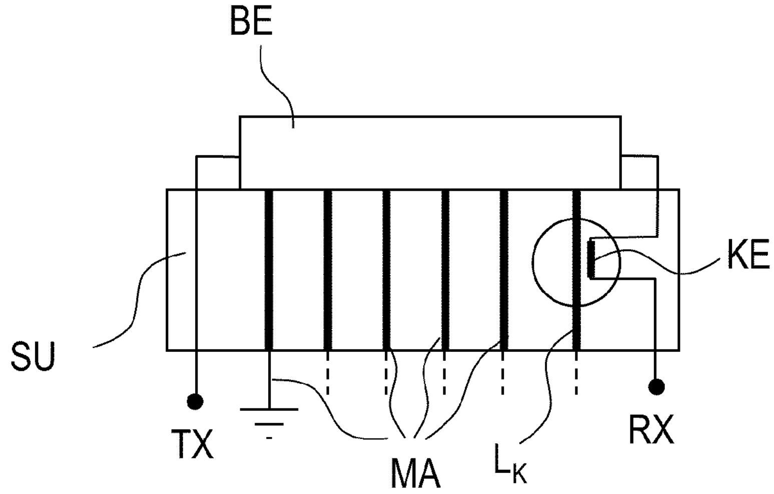
FIG. 5 shows a first embodiment of an inductive coupling element.

FIG. 5 shows a specific embodiment of a coupling element. In this case, it is assumed that the RF configuration is mounted on a substrate SU, with the ground connections MA of the first and second components being implemented substantially by way of feed-throughs through the substrate SU. Preferably, the first and second signal paths RX, TX are also routed through the substrate. At least one of these feed-throughs that contribute to the ground connection MA and the associated conductor leads is used to provide the coupling linking inductance $L_K$. To this end, a conductor segment of the receiver path RX is routed in the proximity of and parallel to the coupling linking inductance $L_K$ so that adequate coupling can take place between the two conductor lead segments in which inductance is present.

Using the configuration shown, the coupling current that was decoupled in the coupling element and fed into the RX branch (receiver branch RX) is obtained in the desired polarity which compensates for the crosstalk across all of shared ground connections MA into the receiver branch RX. In the figure, the first and the second RF components are shown as one component BE which can be a shared housing for the first and second RF components.

Figure 6:
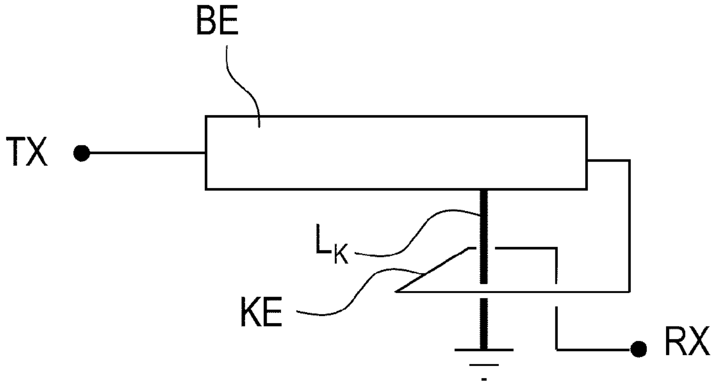
FIG. 6 shows another embodiment of a coupling element in which the coupling element is the winding of a coil.

FIG. 6 shows yet another embodiment of the coupling element, by means of which it is possible to implement the coupling element KE with higher inductance. To this end, the receiver path RX is a conductor loop that constitutes the coupling element KE. The conductor loop is routed around the conductor segment in which the coupling linking inductance $L_K$ is present and which is part of the ground connection MA. At the same time, it is possible to route a relatively large number of conductor path loops around the conductor segment of the coupling inductance $L_K$ and thus to adjust the inductance ratio of the coupling linking inductances as desired.

Figure 7:
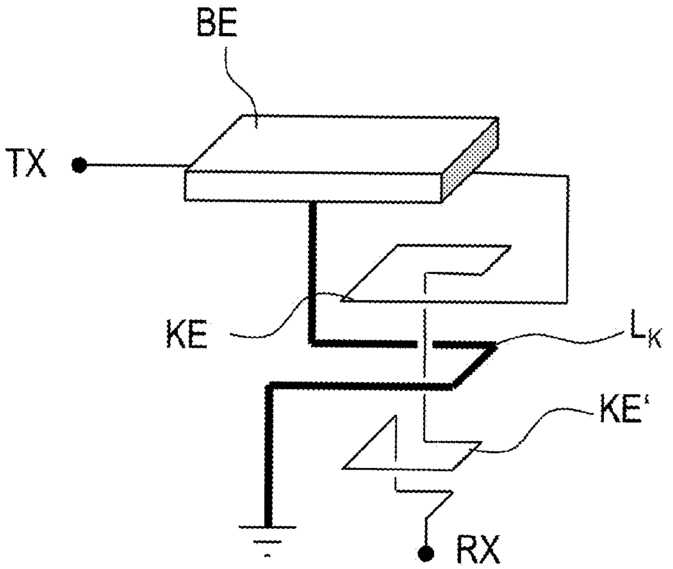
FIG. 7 shows a coupling element with two loops and a coupling ground connection with one loop.

Another improved embodiment of a coupling inductor and a coupling element is shown in FIG. 7. Both the part of the ground connection that serves as coupling linking inductor $L_K$ and the conductor segments of the receiver path RX that serve as coupling element KE have windings so as to increase the inductance of the conductor segments.

FIG. 7 shows the receiver path with two windings having the same winding sense. Each of these windings (loops) can be assembled from straight conductor segments within the substrate SU. The part of the ground connection in which the coupling linking inductance $L_K$ is present also forms a loop which, in the same winding sense, loops around the receiver path between the two loops. In this manner, it is possible to set the ratio between the inductance of the coupling elements KE and the coupling linking inductance $L_K$ at greater than one so as to be able to operate with physically maximum implementable coupling factors lower than one and still ensure a favorable coupling ratio of approximately one.

In embodiments of the RF configuration according to the present invention in which the ground connection is implemented in the form of conductor leads comprising feed-throughs that are practically completely contained within a substrate SU, the overall inductance is, for example, in a range of 10 pH while the part used for coupling, i.e., the coupling linking inductance $L_K$, is within a range of approximately 0.5 nH. By choosing the already mentioned favorable coupling ratio between the coupling element and the coupling inductance of approximately five, it is possible, in a modern duplexer with a reduced number of feed-throughs, in spite of the finite linking inductance, to completely compensate for the crosstalk that normally occurs as a result of the voltage drop across the inductance of the ground connection.

Figure 8:
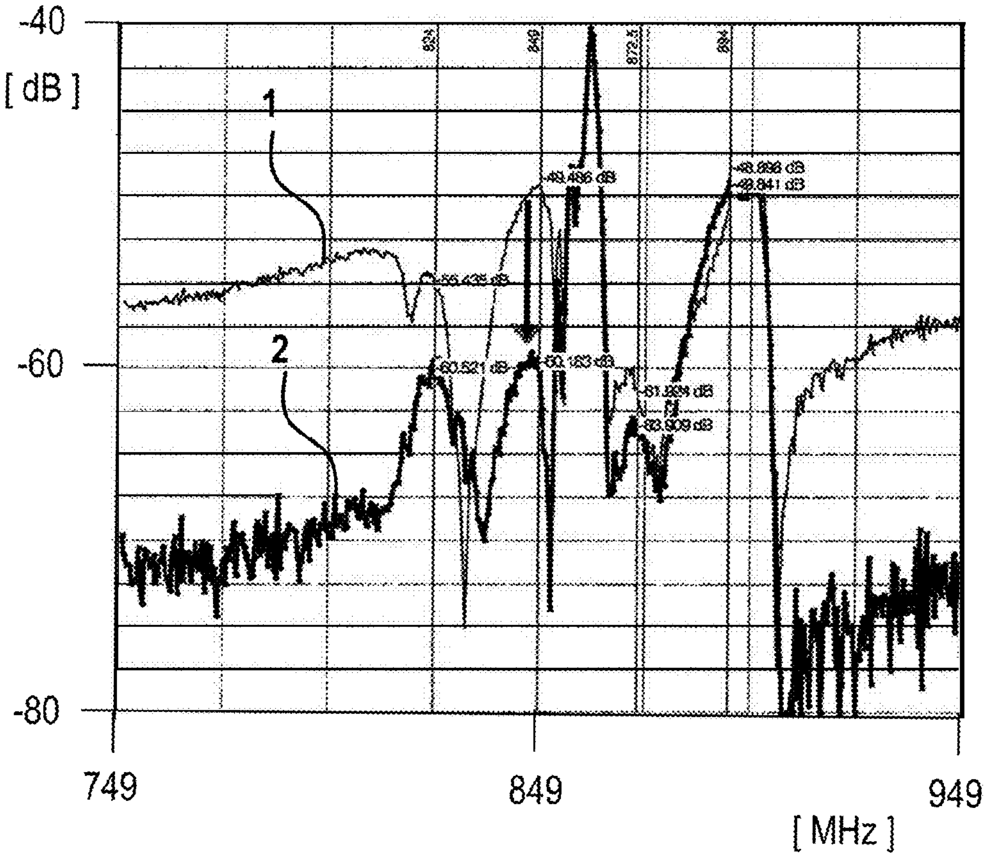
FIG. 8 shows the recorded crosstalk of a duplexer with and without a coupling element.

FIG. 8 shows the recorded crosstalk of two duplexers of substantially identical construction, one of which has a coupling element (curve 2) and the other does not have a coupling element (curve 1), plotted against the frequency. As demonstrated, it is possible to reduce the crosstalk in a desired range, in this case, for example, by 11 dB (see arrow at approximately 849 megahertz). The fact that at higher frequencies, the crosstalk at some points is seen to be increased is of no importance to the function of the duplexer. The crosstalk generated in a prior-art duplexer due to the inductance of the ground connection occurs specifically in the frequency range of the transmitter path TX which in the figure corresponds precisely to the region in which the crosstalk is reduced. The residual crosstalk is now attributable exclusively to the finite basic insulation between the two filters and is inherent in the design and the housing and has nothing to do with the crosstalk caused by the inductance present of the ground connection.

Although the invention has been explained on the basis of only a few practical examples and, in particular, on the basis of one example of a duplexer, it is not limited to these practical examples. Instead, the invention can be used for different configurations comprising a first and a second RF component, which are connected to each other by means of a shared ground connection and, in particular, by means of a shared module ground. The present invention is especially useful for use in configurations in which the ground connection is implemented with a reduced number of conductor leads and, in particular, with a reduced number of feed-throughs through a shared substrate on which both the first and the second RF components are disposed. The invention is also recommended for use in configurations which have a bad substrate and/or module ground and in which greater crosstalk is therefore generated.

The actual design of the ground connections and the coupling element can be randomly varied as long as at least a part of the ground connection is able to couple to a coupling element to decouple a coupling current and feed it back into the signal path of the second component to compensate for the crosstalk between the two components, triggered by the voltage drop on the ground connection. Suitable applications for use of the present invention are modules that integrate duplexers, for example, front end modules with a transmitter amplifier, front end modules with a plurality of duplexers that are actively or passively interconnected, and complete transceiver modules.

What is claimed is:

1. An RF circuit, comprising:
a first RF component comprising a filter;
a signal path connected to an input and an output, the filter being disposed in the signal path;
a ground connection, the filter being coupled to ground via the ground connection; and
a coupling element serially interconnected in the signal path and electromagnetically coupled to the ground connection, wherein current decoupled by the coupling element is fed into the signal path of the filter.

2. The RF circuit as in claim 1, further comprising a second RF component which has at least one signal path that serves as the input or the output and which, in conjunction with the filter, shares the ground connection with the filter and is connected via the ground connection to the ground.

3. The RF circuit as in claim 2,
wherein the first and second RF components are mounted on a multilayer substrate,
wherein the ground connection is one of multiple ground connections of the RF circuit, and
wherein the coupling element and at least some of the multiple ground connections are formed in the multilayer substrate as conductor segments, conductor loops, ground planes, feed-throughs or combinations of these elements.

4. The RF circuit as in claim 2, wherein the first and second RF components comprise RF filters and are interconnected with a shared antenna.

5. The RF circuit as in claim 2,
wherein each of the first and second RF components comprises an RF filter and each is interconnected with a duplexer, and
wherein the coupling element feeds coupling current into a RX path of the duplexer.

6. The RF circuit as in claim 2,
wherein the first and the second RF components comprise RF filters, and
wherein the RF filters, independently of one another, are SAW filters, BAW filters, dielectric ceramic filters and/or LC filters.

7. The RF circuit as in claim 1,
wherein the ground connection has a finite linking inductance, and
wherein the coupling element comprises a coupling inductor.

8. The RF circuit as in claim 1,
wherein the ground connection that couples to the coupling element is one of a number of ground connections of the circuit,
wherein an inductance of the ground connection that couples to the coupling element is high compared to an inductance of a sum of the ground connections of the circuit, and
wherein a ratio between the inductance of the ground connection that couples to the coupling element and an inductance of the coupling element is set to be lower than 1.

9. The RF circuit as in claim 1, wherein the coupling element forms at least one conductor loop.

10. The RF circuit as in claim 1, wherein the ground connection comprises a feed-through.

11. The RF circuit as in claim 1, wherein the ground connection comprises a conductor loop.

12. The RF circuit as in claim 1, wherein the coupling element forms at least one conductor loop which is routed around the ground connection which, at least in sections, takes a form of a feed-through.

13. The RF circuit as in claim 1, wherein the coupling element and the ground connection take the form of conductor segments or feed-throughs that are routed parallel to one another.

14. The RF circuit as in claim 13, wherein a distance between the coupling element and the ground connection is shorter than a distance between the coupling element and other ground connections.

15. The RF circuit as in claim 1, wherein the coupling element is serially interconnected in the signal path.

16. The RF circuit as in claim 1, wherein the coupling element is interconnected parallel to the signal path.

17. The RF circuit as in claim 1, wherein the first RF component is disposed on a multilayer substrate and interconnected by way of the multilayer substrate, wherein the multilayer substrate comprises a plurality of dielectric layers, between which are disposed structured metalized planes, and wherein the multilayer substrate is made of a multilayer ceramic, an LTCC, an HTCC, a glass fiber-reinforced epoxy resin, an organic laminate or a glass laminate.

18. A method for compensating an inductance of a ground connection, the method comprising:

coupling an RF filter to a ground of a circuit environment via the ground connection, the RF filter being disposed in a signal path, wherein a finite inductance is present in the ground connection; and providing a coupling element that couples to the ground connection, wherein the influence on a stop band suppression is suppressed as a function of an inductance of the ground connection when a ground current flows through the ground connection; and wherein a coupling current being induced in the coupling element by the ground current is fed into the signal path of the RF filter.

19. The method as in claim 18, wherein the method is used to insulate the RF filter from a second RF component that shares the ground connection with the RF filter and is connected via the ground connection to the ground, wherein the RF filter induces a voltage drop in the second RF component by way of a current flow through the ground connection, and wherein a coupling current is induced by means of the coupling element that couples to the ground connection from the ground current and is fed into the signal path of the second RF component so as to compensate at least in part for the voltage drop generated by the ground current of the RF filter.

20. The method as in claim 19, wherein the ground connection is implemented by means of several wiring connections, and wherein part of the ground connection, which comprises at least one wiring connection, inductively couples to the coupling element, and the coupling current is serially fed into the signal path of the second RF component.

* * * * *